United States Patent [19]

Schonlau et al.

[11] Patent Number: 5,152,378
[45] Date of Patent: Oct. 6, 1992

[54] BRAKE PRESSURE CONTROL DEVICE

[75] Inventors: Jergen Schonlau, Walluf; Peter Volz, Darmstadt; Alfred Birkenbach, Hattersheim, all of Fed. Rep. of Germany

[73] Assignee: Alfred Teves GmbH, Frankfurt am Main, Fed. Rep. of Germany

[21] Appl. No.: 571,021

[22] Filed: Aug. 22, 1990

Related U.S. Application Data

[63] Continuation of Ser. No. 313,914, Feb. 22, 1989, abandoned.

[30] Foreign Application Priority Data

Feb. 25, 1988 [DE] Fed. Rep. of Germany ....... 3505831

[51] Int. Cl.$^5$ .............................................. B60T 8/22
[52] U.S. Cl. ................................... 188/195; 303/9.63; 303/9.69; 303/9.76
[58] Field of Search .................. 188/1.11, 151 A, 195, 188/349; 303/9.63, 9.67, 9.68, 9.69, 9.74, 9.75, 9.76

[56] References Cited

U.S. PATENT DOCUMENTS

| | | | |
|---|---|---|---|
| 3,848,932 | 11/1974 | Lewis | 188/195 X |
| 3,917,355 | 11/1975 | Takeuchi | 303/9.63 |
| 3,977,735 | 8/1976 | Bush et al. | 188/195 X |
| 4,049,323 | 9/1977 | Hess | 188/349 X |
| 4,050,552 | 9/1977 | Young | 303/9.69 X |
| 4,083,032 | 4/1978 | Nakamura et al. | 188/1.11 X |
| 4,097,841 | 6/1978 | Otsuka et al. | 303/9.63 X |
| 4,118,077 | 10/1978 | Carre | 303/9.75 X |
| 4,332,432 | 6/1982 | Schopper et al. | 188/195 X |
| 4,707,036 | 11/1987 | Farr | 303/9.69 |
| 4,708,225 | 11/1987 | Feldman et al. | 188/1.11 |
| 4,840,433 | 6/1989 | Schonlau et al. | 303/9.68 |

FOREIGN PATENT DOCUMENTS

| | | |
|---|---|---|
| 2614080 | 10/1976 | Fed. Rep. of Germany . |
| 2701003 | 7/1977 | Fed. Rep. of Germany . |
| 2627166 | 12/1977 | Fed. Rep. of Germany . |
| 2703851 | 1/1978 | Fed. Rep. of Germany . |
| 1329058 | 9/1973 | United Kingdom ............... 188/195 |

Primary Examiner—Robert J. Oberleitner
Assistant Examiner—Peter M. Poon
Attorney, Agent, or Firm—Robert P. Seitter; J. Gordon Lewis

[57] ABSTRACT

To warn the driver of an automotive vehicle in the event of failure of a component of the actuating apparatus in a brake pressure control device with two control valves which are acted upon by an actuating varied by an actuating variable which is common for both control valves, a separate actuating apparatus is provided for each control valve. The differential pressure between the pressure fluid outlets is permanently monitored.

4 Claims, 2 Drawing Sheets

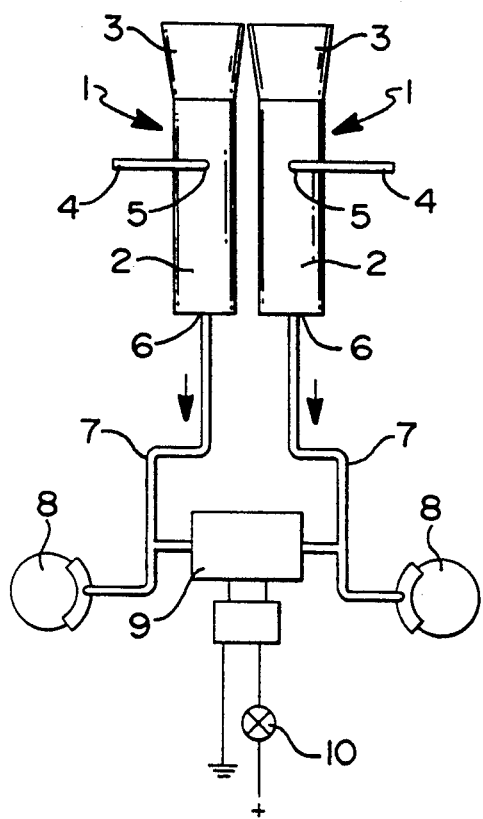
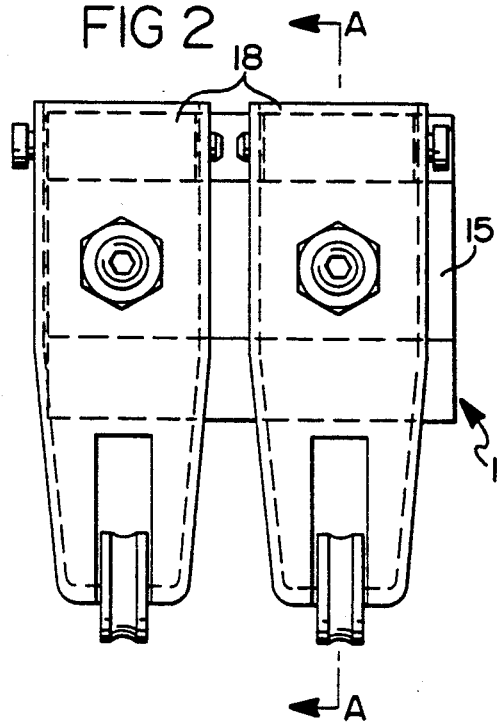
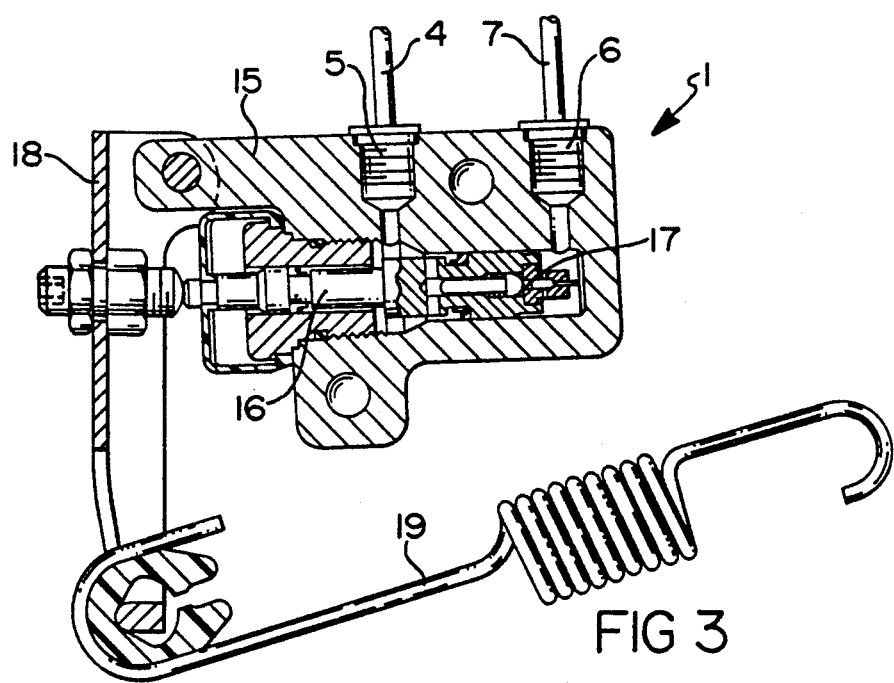

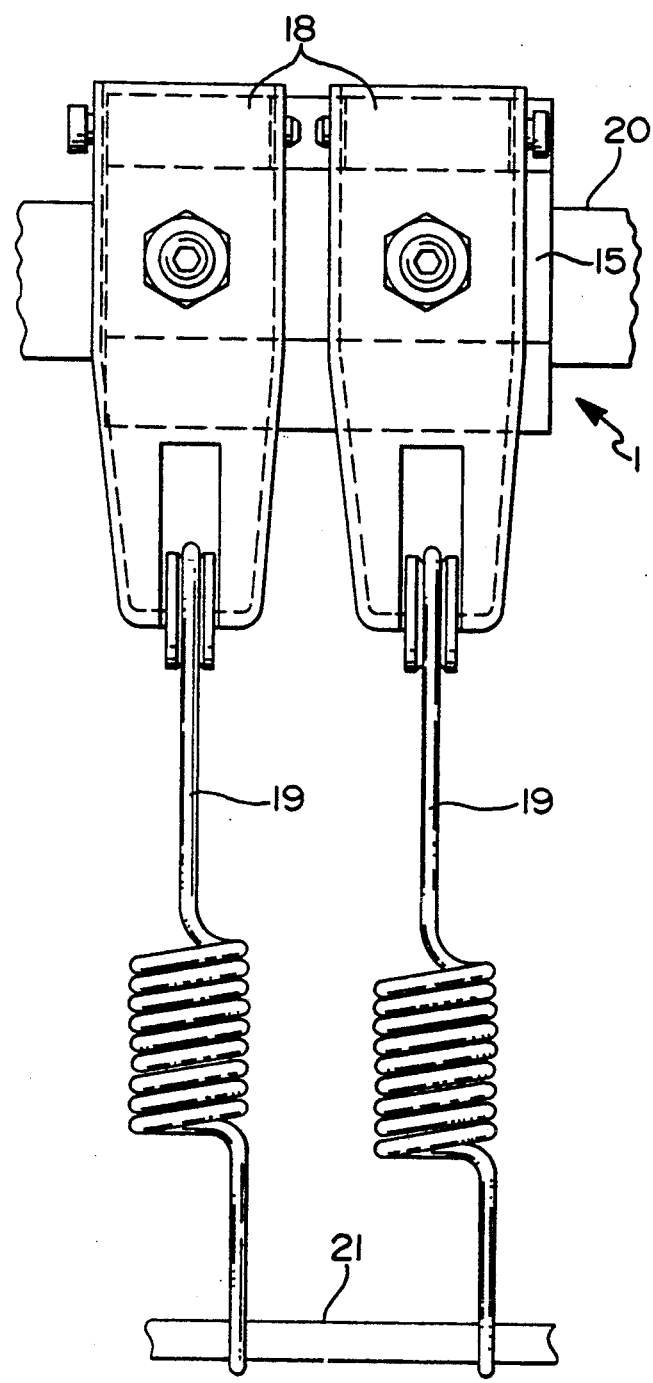

BRAKE PRESSURE CONTROL DEVICE

This application is a continuation of application Ser. No. 07 313,914, filed Feb. 22, 1989, now abandoned.

BACKGROUND OF THE INVENTION

This invention relates to a brake pressure control device for automotive vehicles, with two control valves which are respectively positioned between a pressure fluid inlet and a pressure fluid outlet. An actuating force is varied by an actuating variable which is common to both control valves.

A brake pressure control device of this type is known from published German patent application No. 26 14 080. As disclosed therein, the actuating force is transmitted through a lever pivoted on the housing to two control pistons and which are arranged parallel to each other. The actuating force is generated by a control spring whose initial tension is varied in accordance with the relative displacement between a sprung and an unsprung part of the vehicle. With this brake power control it is a disadvantage that if a failure occurs in a part of the actuating apparatus the driver is alerted of the fault.

SUMMARY OF THE INVENTION

It is therefore an object of the present invention to provide a brake pressure control device of the type described in which the function of actuation of the control valves is constantly monitored and in which the driver is warned by way of a signal in the event of a fault. This is provided in a low-cost and simple-design manner.

According to the invention, the aforementioned object is achieved in the brake pressure control device of the type described in that a separate actuating apparatus is provided for each control valve and in that the differential pressure between the hydraulic fluid outlets is permanently monitored. Such monitoring may, for example, take place by a known differential pressure alarm switch which is advantageously accommodated in a common housing together with the two control valves.

A brake system, in particular for commercial vehicles, is known from published German patent application No. 26 27 166 in which each of the two control pistons is acted upon by one each actuating appartus and in which a differential pressure switch is arranged between the two controller outlets. However, each control piston is actuated by a separate actuating variable, that is, by the axle load of the left and of the right rear wheel, respectively. Actuation by two actuating variables which are independent of each other is provided in order to trigger an alarm signal in case of an unsymmetrical load of the vehicle. Furthermore, the purpose of the separate actuation of each of the two control pistons with a separate actuating variable is to ensure that when braking an unsymmetrically loaded vehicle, the reduction of the brake pressure of each rear wheel brake takes place in accordance with its related wheel load.

It is, however, a particularly significant disadvantage of this brake system that on brake actuation while driving through curves the change-over pressure of the wheel positioned toward the outside of the curve is strongly increased so that the brake torque at the wheel positioned toward the outside of the curve may adopt a value is so high that the wheel can no longer absorb any lateral guiding forces. This disadvantage does not occur in the brake pressure control device according to the present invention, because the actuating force of both control valves is determined by a common middle actuating variable.

BRIEF DESCRIPTION OF THE DRAWING

Further advantageous features and the functioning of the brake pressure control device according to the present invention are set forth in the following detailed description, taken in conjunction with the accompanying drawing, in which:

FIG. 1 illustrates an embodiment as a brake pressure control device in which the change-over pressure is determined by deceleration;

FIGS. 2 and 2A show an embodiment of the present invention as a brake pressure control device in which the variation of the change-over pressure is determined by load; and, FIG. 3 shows a cross section along the line A—A in FIG. 2.

DETAILED DESCRIPTION OF A PREFERRED EMBODIMENT

The brake pressure control device diagrammatically illustrated in FIG. 1 comprises two deceleration sensitive brake power distributors 1 which elements are known and which are each furnished with a control valve (not shown) and are positioned in the section 2. Each distributor comprises an inertial (not shown) positioned in section 3 and which acts upon the control valve in accordance with the prevailing deceleration. The two deceleration-sensitive brake power distributors 1 are each connected, through their repective pressure fluid inlet 5 with a respective line 4, to a chamber of a tandem master cylinder. A brake piping 7 leads from each of the pressure fluid outlets 6 to the corresponding rear wheel brake 8. Between the two brake pipings 7, a differential pressure alarm switch 9 is arranged which switches the warning lamp 10 on when a predetermined differential pressure has occured.

FIGS. 2, 2A and 3 show an embodiment of the present invention in which the change-over pressure of the brake pressure reducer is variable depending on the load. Within a housing 15, two control pistons 16, each with one control valve 17, are positioned parallel to each other and control the link between the pressure fluid inlet 5 and the pressure fluid outlet 6. The ends of the control pistons 16 projecting from the housing 15 are acted upon by two actuating levers 18 pivoted on the housing 15. A control spring 19 acts at each end of the two actuating levers 18 in opposing relation to the pivot point. The housing 15 is secured to a sprung part 20 of the chassis, but the ends of the control springs 19 opposed to each of the actuating levers 18 are fastened to an unsprung element of the axle 21. In this way, the change-over point is varied as a function of the bounce or relative movement of the vehicle.

According to FIG. 1, the pressure fluid inlets 5 and the pressure fluid outlets 6 are connected to the lines 4, respectively to the brake pipings 7 which are succeeded by the two rear wheel brakes B. Also, a differential pressure alarm switch 9 is positioned between the two brakes pipings 7, repectively between the two pressure fluid outlets 6 by which the warning lamp 10 is switched on when a predetermined differential pressure occurs.

In this configuration, the differential pressure alarm switch 9 may be integrated in the housing 15.

If in the brake pressure control device according to the present invention a defect occurs in a component which provides the variation of the change-over pressure such as by the rupture of one of the control springs 19 or the clamping of one of the two inertial bodies accommodated in the sections 3, a differential pressure will result between the two brake pipings 7 which is signalled to the driver by the illumination of warning lamp 10. However, a warning signal is given to the driver also if and when a leakage or separation occurs in the gaskets of a control piston and in the event of a leakage in a brake piping. A distinct advantage offered by the brake pressure control device according to the present invention is, in any event, its capability of signalling the failure of a component of the mechanical actuating system.

What is claimed is:

1. An automotive vehicle brake pressure control system comprising:
   first and second control valves in a common housing;
   means for supplying fluid under pressure to said first and said second control valves;
   a first fluid outlet line for conducting fluid from said first control valve to a first wheel brake;
   a second fluid outlet line for conducting fluid from said second control valve to a second wheel brake;
   first and second actuating means extending parallel to each other between a common reference point and said first and said second control valves, respectively, for controlling said first and said second control valves, respectively, said common reference point located on an unsprung element of said vehicle;
   and differential pressure sensing means connected between said first and said second fluid outlet lines and responsive to the fluid in said first and said second fluid outlet lines for sensing the pressure difference between the pressures of the fluid in said first and said second fluid outlet lines.

2. An automotive vehicle brake pressure control system according to claim 1, further including alarm means responsive to said differential pressure sensing means for developing an indication when the pressure difference between the pressures of the fluid in said first and said second fluid outlet lines exceeds a predetermined level.

3. An automotive vehicle brake pressure control system according to claim 2 wherein each of said actuating means includes a piston acting on one of said control valves, an actuating lever pivotally mounted on said common housing, and a control spring connected between said actuating lever and said reference point and urging said actuating lever against said piston.

4. An automotive vehicle brake pressure control system according to claim 2 wherein said common housing is mounted on a sprung part of the chassis of an automotive vehicle and said reference point is on an unsprung part of the axle of said vehicle.

* * * * *